United States Patent
Wang et al.

(10) Patent No.: US 8,025,160 B2
(45) Date of Patent: *Sep. 27, 2011

(54) SULFUR-IMPREGNATED ORGANOCLAY MERCURY AND/OR ARSENIC ION REMOVAL MEDIA

(75) Inventors: Zhen Wang, Lake Zurich, IL (US); Robert Abraham, Bolingbrook, IL (US)

(73) Assignee: Amcol International Corporation, Hoffman Estates, IL (US)

( * ) Notice: Subject to any disclaimer, the term of this patent is extended or adjusted under 35 U.S.C. 154(b) by 655 days.

This patent is subject to a terminal disclaimer.

(21) Appl. No.: 12/116,405

(22) Filed: May 7, 2008

(65) Prior Publication Data

US 2008/0302730 A1   Dec. 11, 2008

Related U.S. Application Data

(63) Continuation-in-part of application No. 11/810,363, filed on Jun. 5, 2007, now Pat. No. 7,910,005.

(51) Int. Cl.
*B01D 39/02* (2006.01)

(52) U.S. Cl. ......... 210/502.1; 210/504; 55/524; 502/62; 502/80; 502/401; 502/407

(58) Field of Classification Search ............... 210/502.1, 210/504, 506, 688, 912, 914; 95/134, 900; 55/524; 502/62, 80, 401, 407
See application file for complete search history.

(56) References Cited

U.S. PATENT DOCUMENTS

| | | | |
|---|---|---|---|
| 4,033,764 A * | 7/1977 | Colegate et al. | 423/24 |
| 4,094,777 A | 6/1978 | Sugier et al. | |
| 4,911,825 A | 3/1990 | Roussel et al. | |
| 5,366,647 A | 11/1994 | Gutierrez et al. | |
| 5,512,526 A | 4/1996 | Greco | |
| 5,989,506 A | 11/1999 | Markovs | |
| 6,232,388 B1 | 5/2001 | Lan et al. | |
| 6,376,591 B1 | 4/2002 | Lan et al. | |
| 6,398,951 B1 | 6/2002 | Smith et al. | |
| 6,398,966 B1 | 6/2002 | Smith et al. | |
| 6,409,924 B1 | 6/2002 | Johnson et al. | |
| 6,749,757 B2 | 6/2004 | Smith et al. | |
| 6,787,592 B1 | 9/2004 | Powell et al. | |
| 6,793,805 B2 | 9/2004 | Didillon et al. | |
| 7,288,499 B1 | 10/2007 | Lovell et al. | |
| 7,510,992 B2 * | 3/2009 | Wang et al. | 502/80 |

(Continued)

FOREIGN PATENT DOCUMENTS

EP    810278 B1   12/1997

OTHER PUBLICATIONS

Granite, et al., "Novel Sorbents for Mercury Removal from Glue Gas," Ind. Eng. Chem. Res., vol. 39, pp. 1020-1029 (2000).

(Continued)

*Primary Examiner* — Matthew Savage
(74) *Attorney, Agent, or Firm* — Marshall, Gerstein & Borun LLP

(57) ABSTRACT

The use of a sulfur-impregnated organoclay provides a mercury or arsenic removal media having increased reactivity, stability, and mercury removal ability. The Hg/As removal media described herein is prepared by impregnating an organophilic clay with elemental (free state) sulfur. Alternatively, the clay can be made organophilic by onium ion reaction prior to or simultaneously with impregnating the organoclay with sulfur.

24 Claims, 8 Drawing Sheets

U.S. PATENT DOCUMENTS

| | | | |
|---|---|---|---|
| 2004/0102332 | A1 | 5/2004 | Thompson et al. |
| 2005/0103707 | A1 | 5/2005 | Olsta et al. |
| 2006/0000767 | A1 | 1/2006 | Trauger et al. |
| 2006/0048645 | A1* | 3/2006 | Postma et al. ............ 95/134 |
| 2006/0166840 | A1 | 7/2006 | Miller |
| 2006/0273015 | A1 | 12/2006 | Pinnavaia et al. |
| 2006/0286888 | A1 | 12/2006 | Olsta et al. |
| 2007/0059542 | A1 | 3/2007 | Olsta et al. |
| 2007/0119300 | A1 | 5/2007 | Yang et al. |
| 2007/0122327 | A1 | 5/2007 | Yang et al. |
| 2007/0206994 | A1 | 9/2007 | Olsta et al. |

OTHER PUBLICATIONS

International Preliminary Report on Patentability in counterpart International Application No. PCT/US2009/040435, dated Aug. 17, 2010.

* cited by examiner

SULFUR-IMPREGNATED ORGANOCLAY MERCURY AND/OR ARSENIC ION REMOVAL MEDIA

CROSS-REFERENCE TO RELATED APPLICATION

This application is a continuation-in-part of application Ser. No. 11/810,363 filed Jun. 5, 2007, now U.S. Pat. No. 7,910,005. The entire text of the priority application is incorporated herein by reference in its entirety.

FIELD OF THE INVENTION

The present invention is directed to compositions; methods of manufacturing the compositions; and methods of using the compositions for removing mercury (organic mercury, Hg, $Hg^+$; and/or $Hg^{+2}$) and/or arsenic ($As^{+3}$ and/or $As^{+5}$) from water; and/or gas streams, e.g., natural gas; industrial smoke stacks; and the like. The compositions, also identified herein as "media", or "mercury removal media", or "arsenic removal media", or "Hg/As removal media", can be used to remove mercury and/or arsenic from any water source and is particularly useful for removal of mercury and/or arsenic from drinking water; industrial waste water; contaminated groundwater; contaminated sediment; offshore produced water, so that the produced water can be returned to the ocean; and for removal of mercury and/or arsenic from aqueous mining wastes. The Hg/As removal media comprises a homogeneous, preferably extruded composition comprising a layered phyllosilicate, elemental sulfur (free state sulfur), and an organic phyllosilicate surface treating agent, preferably an onium cation, resulting in an organoclay containing sulfur. The sulfur is bonded to the phyllosilicate covalently, ionically, physically, or by a combination of mechanisms.

BACKGROUND AND PRIOR ART

Mercury and arsenic contaminants are found in water, and mercury is found in both water and gases primarily from volcanic eruptions; coal fired power plants; emissions from coal combustion; mercury vapor and/or particles from natural gas; produced water from the oil and gas industry; waste waters from gold production and non-ferrous metal production (e.g., smelters); waste water from cement production; sewage sludge incineration; caustic soda production; pig iron and steel production; and mercury production waste, mainly for battery incorporation. Products containing mercury include: auto parts, batteries, fluorescent bulbs, medical products, thermometers, and thermostats.

The technologies available for mercury and arsenic removal, such as precipitation, coagulation/co-precipitation, activated carbon adsorption, ion-exchange and the like, are not sufficiently effective for mercury and arsenic (arsenite and arsenate compounds) removal. This assignee's organoclay has been proven effective on a variety of organic contaminants in the last decade. See, for example, this assignee's U.S. Pat. Nos. 6,398,951; 6,398,966; 6,409,924; and 6,749,757, incorporated herein by reference. A new Hg/As filtration media, described herein, can be operated in a similar fashion, or together with the organoclay media, but is much more effective for mercury or arsenic removal.

The Hg/As removal media described herein has a similar physical form to the organoclays used for organic contaminant removal and can be similarly packed in a canister or cartridge, as described in the above-listed patents. In addition, the Hg/As removal media described herein can be deployed in single layer or multi-layer water-permeable mats, as described in this assignee's published application Ser. Nos. 10/718,128, filed Nov. 19, 2003 (Publication No. 2005-01013707 A1), Ser. No. 11/221,019, filed Sep. 7, 2005 (Publication No. 2006/0000767 A1), [Ser. No. 11/489,383, filed Jul. 19, 2006, (Publication No. 2006-0286888 A1)], Ser. No. 11/599,080, filed Nov. 14, 2006 (Publication No. 2007-0059542 A1); and Ser. No. 11/741,376, filed Apr. 27, 2007 (Publication No. 2007-0206994 A1), all of which are hereby incorporated by reference. Fundamentally, the Hg/As removal media is based on organoclay technology but it has been substantially modified using several unique chemistries to enhance adsorption of mercury and arsenic-containing compounds. The mechanism of mercury adsorption is based upon chemical bonding, ionic bonding, mechanical bonding, or a combination thereof. The mercury and/or arsenic will be bonded to the media's external and internal surfaces and the bonding process is non-reversible.

The Hg/As removal media described herein is effective on all sources of mercury and arsenic including organic types of mercury and arsenic, including organic mercury and arsenic compounds, mercury metal (zero valent); arsenite and arsenate compounds; arsenic ions (both III and V valent); and mercury ions (both I and II valent). When the organic-based mercury and/or arsenic is involved, the adsorption mechanism of partition could be involved in addition to chemical bonding. In addition, the Hg/As removal media described herein also is effective to remove oil, grease and other organic contaminant molecules. The media will be spent eventually when all of the adsorption sites are saturated. The actual media life will depend on the contaminated water compositions and the field operation conditions.

Greco U.S. Pat. No. 5,512,526 describes a clay-based heavy metal removal media prepared by reacting a fatty mercaptan, e.g., dodecylmercaptan, with a fatty alkyl-containing quaternary ammonium compound. As described, the mercaptan's hydrophobic fatty alkyl group associates in some manner with the fatty alkyl group of the quaternary ammonium compound.

SUMMARY

It has been found in accordance with the present invention that the use of a sulfur-impregnated organoclay provides a mercury and arsenic removal media having increased reactivity, stability, and mercury and arsenic removal ability. The Hg/As removal media described herein is prepared by impregnating an organophilic clay with elemental (free state) sulfur. Alternatively, a clay can be made organophilic by treating the clay with a surface-treating agent, such as a polymer capable of increasing the d-spacing of the clay platelets, or preferably, with onium ions prior to or simultaneously with impregnating the resulting organoclay with sulfur.

BRIEF DESCRIPTIONS OF THE DRAWINGS

Figure 1:
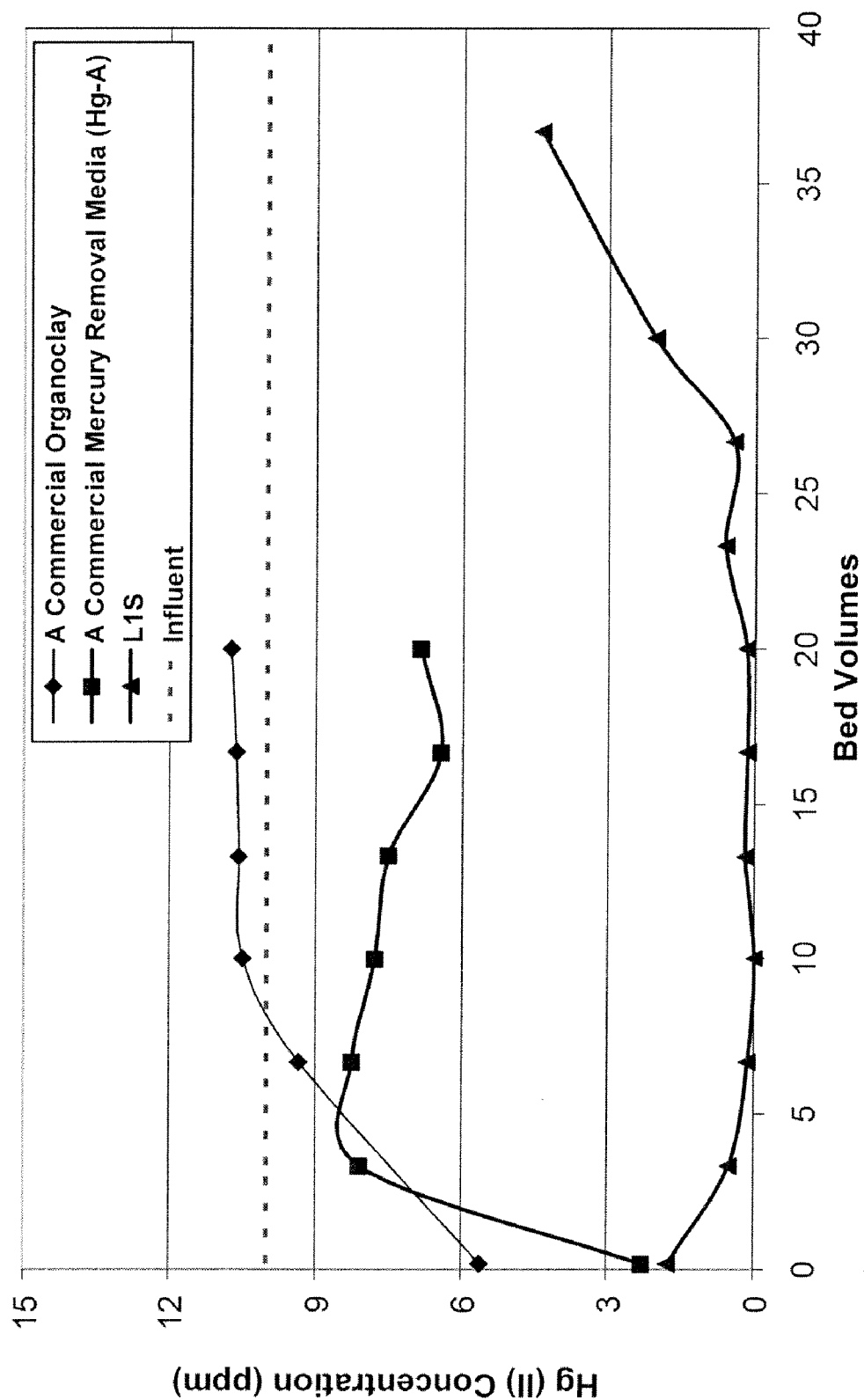
FIGS. 1 and 2 are graphs showing the mercury removal efficacy of the Hg/As removal media described in the examples.

It should be understood that while the following description of the preferred embodiment of the invention is directed to the use of the methods, apparatus and mercury/arsenic removal media on an offshore drilling platform, the invention is also useful for mercury and/or arsenic removal from any contaminated water; and/or gas streams, e.g., industrial smoke stacks, including drinking water; industrial waste waters; contaminated ground water supplies; aqueous mining wastes; and contaminated underwater and soil sediments, particularly when contained in a reactive mat, as described in the applications identified in paragraph [0003], or when used in bulk form, or when used in a blended form, e.g., the other component(s) could be sand, granular anthracite, granular activated carbon, and combinations thereof in amounts of about 1% by weight to about 80% by weight based on the total weight of the blend.

DETAILED DESCRIPTION OF THE PREFERRED EMBODIMENT

It should be understood that while the following description of the preferred embodiment of the invention is directed to the use of the methods, apparatus and mercury/arsenic removal media on an offshore drilling platform, the invention is also useful for mercury and arsenic removal from any contaminated water, including drinking water; industrial waste waters; contaminated ground water supplies; aqueous mining wastes; and contaminated underwater and soil sediments, particularly when contained in a reactive mat, as described in the applications identified in paragraph [0003], or when used in bulk or blended form.

The Hg/As removal media described herein is a sulfur-containing layered organophilic phyllosilicate that is (or has been) made organophilic by reaction with an organic phyllosilicate surface-treating agent, preferably an onium ion-liberating compound, and has been made mercury-reactive and arsenic reactive by impregnation with elemental sulfur.

Phyllosilicate

The phyllosilicate can be a smectite clay, e.g., bentonite, montmorillonite, hectorite, beidellite, saponite, nontronite, volkonskoite, sauconite, stevensite, and/or a synthetic smectite derivative, particularly fluorohectorite and laponite; a mixed layered clay, particularly rectonite and their synthetic derivatives; vermiculite, illite, micaceous minerals, and their synthetic derivatives; layered hydrated crystalline polysilicates, particularly makatite, kanemite, octasilicate (illierite), magadiite and/or kenyaite; attapulgite, palygorskite, sepoilite; or any combination thereof.

Clay Surface Modification Agents

The surface modification (intercalant) agents used for organoclay formation include but are not limited to primary amine, secondary amine, tertiary amine, and onium ions and/or onium salt compounds, polyquat, polyamine, cationic polymers and their derivatives, nonionic polymers, and mixture of thereof.

In the wet process, the surface modification agent, e.g., onium ion, is introduced into the layered material galleries in the form of a solid or liquid composition (neat or aqueous, with or without an organic solvent, e.g., isopropanol and/or ethanol, if necessary to aid in dissolving the onium ion compound) having a surface modification, e.g., onium ion concentration sufficient to provide a concentration of about 5% to about 10% by weight clay (90-95% water) and the surface modification agent, e.g., onium ion compound, is added to the clay slurry water, preferably at a molar ratio of onium ions to exchangeable interlayer cations of at least about 0.5:1, more preferably at least about 1:1. The onium ion-intercalated clay then is separated from the water easily, since the clay is now hydrophobic, and dried in an oven to less than about 5% water, preferably bone dry. The onium ion surface modification agent compound or polymer can be added as a solid with the addition to the layered material surface modification agent blend of preferably about 20% to about 40% water and/or organic solvent, more preferably at least about 30% water or more, based on the dry weight of layered material. Preferably about 30% to about 40% water, more preferably about 25-35% water, based on the dry weight of the layered material, is included in the onium ion intercalating composition, so that less water is sorbed by the intercalate, thereby necessitating less drying energy after onium ion intercalation.

In general, a dry process can be described, as follows, for organoclay media preparation or manufacturing. The powder form of clay mineral is fed into a mixer through a major port for solids, typically an extruder. A separate port for the $2^{nd}$ powder form of solid can also be used besides the clay feeding port. The liquid forms of the additives, including water, intercalant agent, and the coupling agent if any, are fed into the mixer through the separate ports. Either multiple forms of the solids or the liquids could be pre-mixed, or both the solids and the liquids can be pre-mixed through a separate mixer, before they are fed into the extender. A preferred liquid weight is from 10% to 50% based on the total mixture weight, more preferably from 20% to 40%, most preferably from 25% to 35%. The intimate mixture from the extruder will be further dried through a dryer, and be ground to the preferred particle size. A screening process could be used to collect the finished product in the desired particle size distribution.

The onium ions may generally be represented by the following formula:

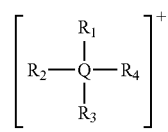

The preferred phyllosilicate surface-treating agent is one or more onium salt compounds, generally represented by the following formula:

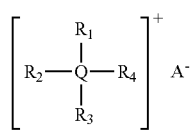

wherein Q=N, P, S;
wherein A=halide, acetate, methylsulfate, hydroxide, preferably chloride;
wherein $R_1$, $R_2$, $R_3$ and $R_4$ are independently organic moieties, or oligomeric moieties or hydrogen. (Ref. U.S. Pat. No. 6,376,591), hereby incorporated by reference. Examples of useful organic moieties include, but not limited to, linear or branched alkyl, benzyl, aryl or aralkyl moieties having 1 to about 24 carbon atoms.

EXAMPLES bis(hydrogenated tallow alkyl)dimethyl ammonium chloride (Arquad® 2HT); benzylbis(hydrogenated tallow alkyl) methyl ammonium chloride (Arquad® M2HTB); benzyl(hydrogenated tallow alkyl)dimethyl ammonium chloride (Arquad® DMHTB); trihexadecylmethyl ammonium chloride (Arquad® 316); tallowalkyl trimethyl ammonium chloride (Arquad® T-27W and Arquad® T-50); hexadecyl trimethyl ammonium chloride (Arquad® 16-29W and Arquad® 16-50); octadecyl trimethyl ammonium chloride (Arquad® 18-50 (m)); and dimethylhydrogenated tallow-2-ethylhexyl ammonium methylsulfate.

Additional phyllosilicate surface-treating agents include the materials set forth below in paragraphs [0024]-[0030].

Quaternary ammonium ions containing ester linkage: (ref U.S. Pat. No. 6,787,592, hereby incorporated by reference, see columns 5 and 6)

EXAMPLE di(ethyl tallowalkylate)dimethyl ammonium chloride (Arquad® DE-T).

Quaternary ammonium ions containing amide linkage: (ref US patent application 2006/0166840 hereby incorporated by reference, see page 2)

The onium ions may be functionalized such as protonated $\alpha,\epsilon$-amino acid with the general formula $(H_3N—(CH_2)_n—COOH)^+$.

Alkoxylated quaternary ammonium chloride compounds (ref. U.S. Pat. No. 5,366,647 hereby incorporated by reference)

EXAMPLES cocoalkylmethylbis(2-hydroxyethyl) ammonium chloride (Ethoquad® C/12); octadecylmethyl[polyoxyethylene(15)] ammonium chloride (Ethoquad® 8/25); and octadecylmethyl (2-hydroxyethyl) ammonium chloride (Ethoquad 18/12).

Polyquat (U.S. Pat. No. 6,232,388, hereby incorporated by reference)

EXAMPLE

N,N,N',N',N'-pentamethyl-N-tallowalkyl-1,3-propane diammonium dichloride (Duaquad® T-50).

Polyamine: (ref. US patent application 2004/0102332 hereby incorporated by reference)

EXAMPLES

N-tallow-1,3-diaminopropane (Duomeen® T); N-tallow-alkyl dipropylene triamine (Triameen® T); and N-tallow-alkyl tripropylene tetramine (Tetrameen® T).

Cationic polymers, non-ionic polymers, including homopolymer or copolymer, low molecular weight or high molecular weight

EXAMPLES

Polydiallydimethylammonium chloride; Poly(dimethylamine-co-epichlorohydrin); Polyacrylamide; and Copolymers of acrylamide and acryloyloxyethyltrimethyl ammonium chloride.

Hg/As Removal Media

In a preferred embodiment, particularly in offshore environments, the Hg/As removal media described herein can be used after the use of an organoclay for removal of organics in order to protect and extend the active life of both the organoclay, in an initial organoclay stage, and the Hg/As removal media, used after organic contaminant removal. An operation procedure using an initial organoclay media followed by contact with the Hg/As removal media, in series, is highly effective. A carbon media can also be used before or after the Hg/As removal media, if necessary. In general, the retention time of contact between Hg -contaminated or AS -contaminated water and the Hg/As removal media should be no less than about 10 seconds, preferably at least about 1 minute, more preferably about 2 minutes or more.

The preferred amount of components of the sulfur-containing organoclay media are as follows, in percent by weight of product (media):

|  | Phyllosilicate | Intercalant Agent | Elemental Sulfur |
|---|---|---|---|
| Preferably | 1-90 | 10-50 | 0.5-50 |
| More Preferably | 35-83 | 15-45 | 2-20 |
| More Preferably | 50-77 | 20-40 | 3-10 |
| More Preferably | 59-71 | 25-35 | 4-6 |
| Most Preferably | 65 | 30 | 5 |

In preparing the product, it is preferred that the particle size of the organophilic clay is fine enough that at least 80% by weight of the clay particles pass through a 20 mesh screen, U.S. Sieve Series; more preferably at least 80% by weight of the clay particles pass through a 100 mesh screen, U.S. Sieve Series; and most preferably at least 80% of the clay particles pass through a 140 mesh screen, U.S. Sieve Series. The preferred sulfur particles have a particles size such that at least 80% by weight of the particles pass through an 18 mesh screen, U.S. Sieve Series; more preferably at least 80% by weight of the sulfur particles pass through at 50 mesh screen, U.S. Sieve Series; even more preferably at least 80% by weight of the sulfur particles pass through an 80 mesh screen, U.S. Sieve Series; and most preferably, at least 80% of the sulfur particles pass through a 100 mesh screen, U.S. Sieve Series.

To achieve the full advantage of the removal media described herein, the final product formed should have a particle size such that at least 80% by weight of the particles pass through a 4 mesh (5 mm) screen; preferably at least 80% of the product particles should be smaller than 3 mm; and more preferably at least 80% by weight the product particles should be smaller than 2 mm. The preferred particle size range for the product particles is such that at least 80% by weight of the product particles are sized between 18 and 50 mesh, U.S. Sieve Series; more preferably at least 80% by weight of the product particles are sized between 10 mesh and 30 mesh, U.S. Sieve Series; even more preferably, at least 80% by weight of the product particles are sized between 8 and 40 mesh, U.S. Sieve Series; and most preferably, at least 80% by weight of the product particles are sized between 6 and 18 mesh, U.S. Sieve Series.

Laboratory Study

A column study was conducted in order to demonstrate the mercury removal media's ability to remove mercury. The influent was composed of ~10 ppm of $Hg(NO_3)_2$ solution with dilute nitric acid matrix. The effluent samples were taken at regular intervals and the mercury content was measured by an ICP analytical test. The flow rate was about 10 bed volumes (BV) per hour, using a 6-minute retention time. The effluent curve is shown in FIG. 1. A commercial mercury removal media (Hg-A of SME Associates, Houston, Tex.) containing a mixture of 85-90% activated carbon and 10-15% sulfur was also included in this study for comparison purposes, as shown in FIG. 1.

Example 1

Sample L1S 400.0 g of bentonite clay (particle size <75 μm preferred, and 8% moisture content) was dry-mixed with 28.75 g of sulfur in the powder form (purchased from Aldrich) using the Kitchen Aid mixer for one minute. 80.0 g of deionized water was added to this bentonite-sulfur mixture slowly under shearing using the same mixer and mixed for 2 minutes. 209.6 g of melt quat (ARQUAD® 2HT from Akzo Nobel, bis(hydrogenated tallow alkyl)dimethyl ammonium chloride, ~83% active) was added to this clay-sulfur-water mixture under shearing using the same mixer, and mixed for 5 minutes. The mixture was extruded three times using a laboratory-scale extruder with a die-plate, and the final extrudates were oven-dried at 85° C. to a moisture content of less than 5% by weight. The dried extrudates were ground and resulting particles between 18 and 40 mesh (US standard sieves) were collected and tested for their performance.

Example 2

The media material collected in Example 1 was packed in a column having an inner diameter of 1.5" and having an empty bed volume (BV) of ~86 mL. The influent was composed of ~10 ppm of Hg(II) in the presence of nitric acid. The effluent samples were taken at regular intervals and the mercury content was measured by the Inductively Coupled Plasma (ICP) analytical technique. The flow rate was about 10 BV/hr with a 6-minute retention time. The effluent data is plotted in FIG. 1. Both a commercial organoclay media (without sulfur) and a commercial mercury removal media of Hg-A were also included in this study for comparison purposes.

Example 3

Production Trial 1

Bentonite powder and sulfur powder (from Harwick Standard Distribution Corporation, grade 104) were blended in a ratio of 93.3:6.7 by weight, and then this mixture was fed into a 5" Readco continuous processor at a feed rate of 900 lb/hr. About 0.25 gallon/minute of water and 1.04 gallon/minute of quat (ARQUAD® 2HT from Akzo Nobel, bis(hydrogenated tallow alkyl)dimethyl ammonium chloride, ~83% active) were also fed in the Readco processor through two independent ports in sequence. The discharged extrudates from the processor were sent to a dryer, the dried extrudates were further milled and the granular particles between 18 and 40 mesh with moisture content less than 5% by weight were collected as the finished product.

Example 4

Figure 2:
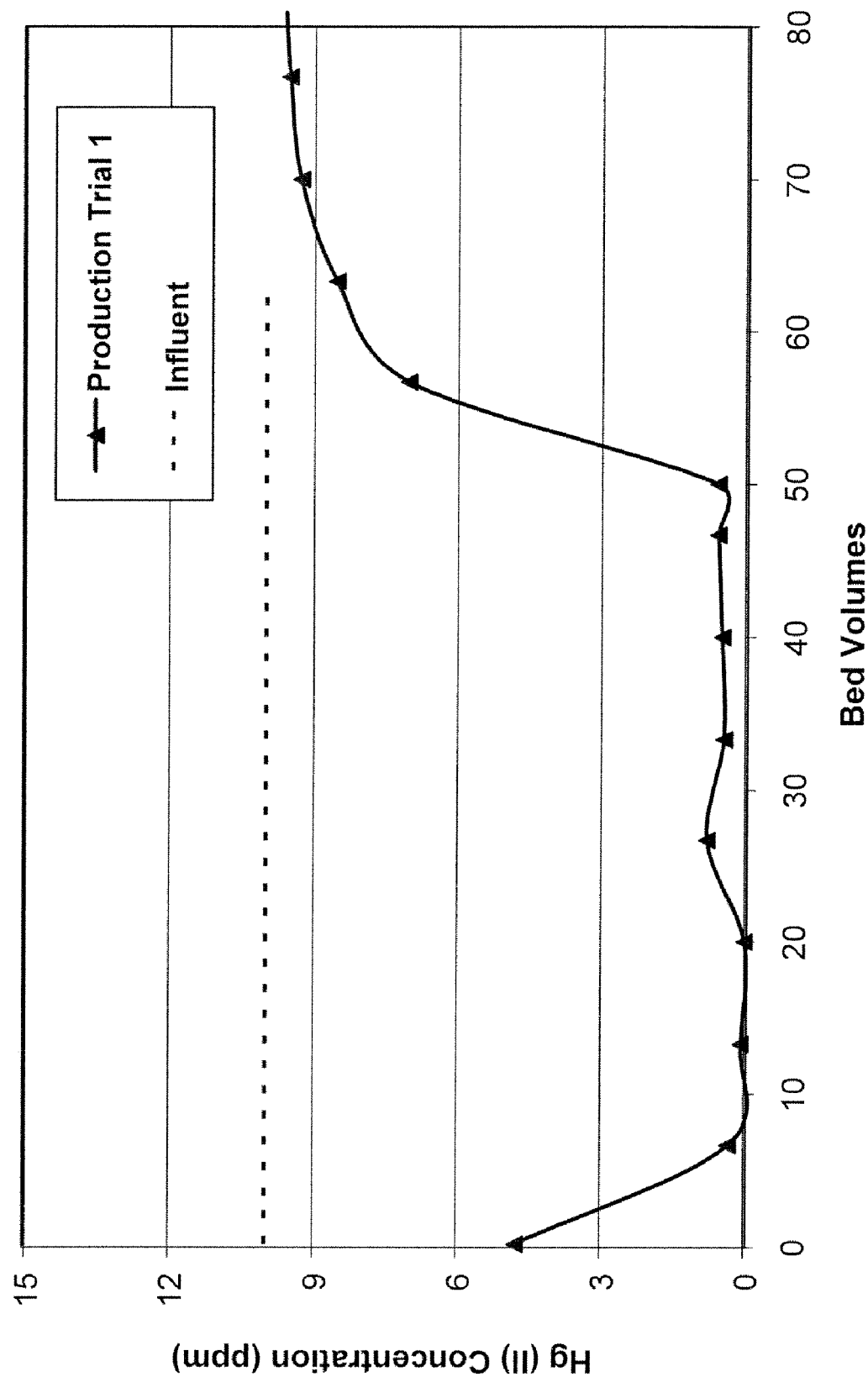

A similar column test as described in Example 2 was conducted on the product sample collected in Example 3. The effluent testing results are plotted in FIG. 2.

Example 5

The media described in Example 3 was tested under offshore platform conditions using actual offshore mercury-contaminated water. A commercial available organoclay product, CrudeSorb™, was also used in front of this Hg/As removal media. The influent had a mercury concentration of 11.4 ppb, and the effluent was 3.4 and 3.9 ppb after the 30 minutes and 90 minutes treatment, respectively. A total mercury removal efficiency of >65% was achieved.

Arsenic Removal Example

Example 6

Figure 3:
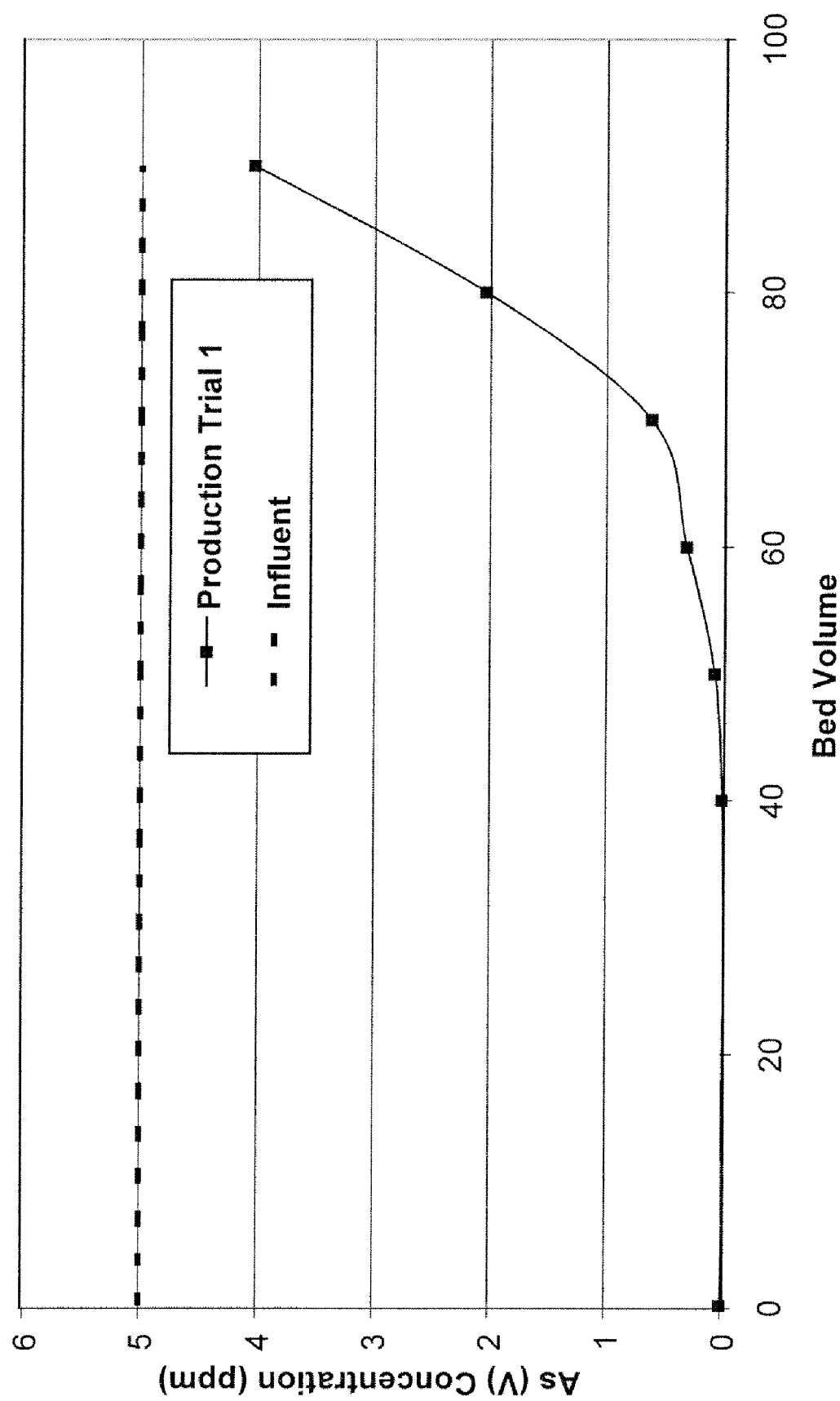
FIG. 3 is a graph showing the arsenic removal results for the Hg/As removal media of Example 6.

The media described in Example 3 was examined for its ability to remove arsenic. The media materials were packed in a column with inner diameter of 1.5" and empty bed volume of ~86 mL. The influent solution was composed of ~5 ppm of As(V). The As(V) stock solution was prepared by dissolving $Na_2HAsO_4.7H_2O$ in the de-ionized water. The effluent samples were taken at regular intervals and the arsenic content was measured by the Inductively Coupled Plasma (ICP) analytical technique. The flow rate was around 10 BV/hr with 6-minute retention time. The effluent data is plotted in FIG. 3.

Offshore Field Study Example for Both Hg and as Removal

Example 7

The media material described in Example 3 was tested under offshore platform conditions using the actual waste water contaminated by both mercury and arsenic. The contaminated water was pumped through two columns in series. Each column had a diameter of 3" and held about 1.5 Liter of media (~1,125 grams). The first column was packed with the commercial available organoclay media, CrudeSorb™, and the second column was packed the media material described in Example 3. The retention time was roughly equal to 5-minute. The influent had mercury and arsenic concentration of 11.4 ppb and 7.55 ppb, respectively. After the 30 minutes and 90 minutes treatment, the effluent had mercury concentrations of 3.4 ppb and 3.9 ppb, arsenic concentrations of 5.18 ppb and 5.16 ppb, respectively. So a total mercury and arsenic removal efficiency of greater than 65% and 30% were achieved, respectively.

Figure 4:
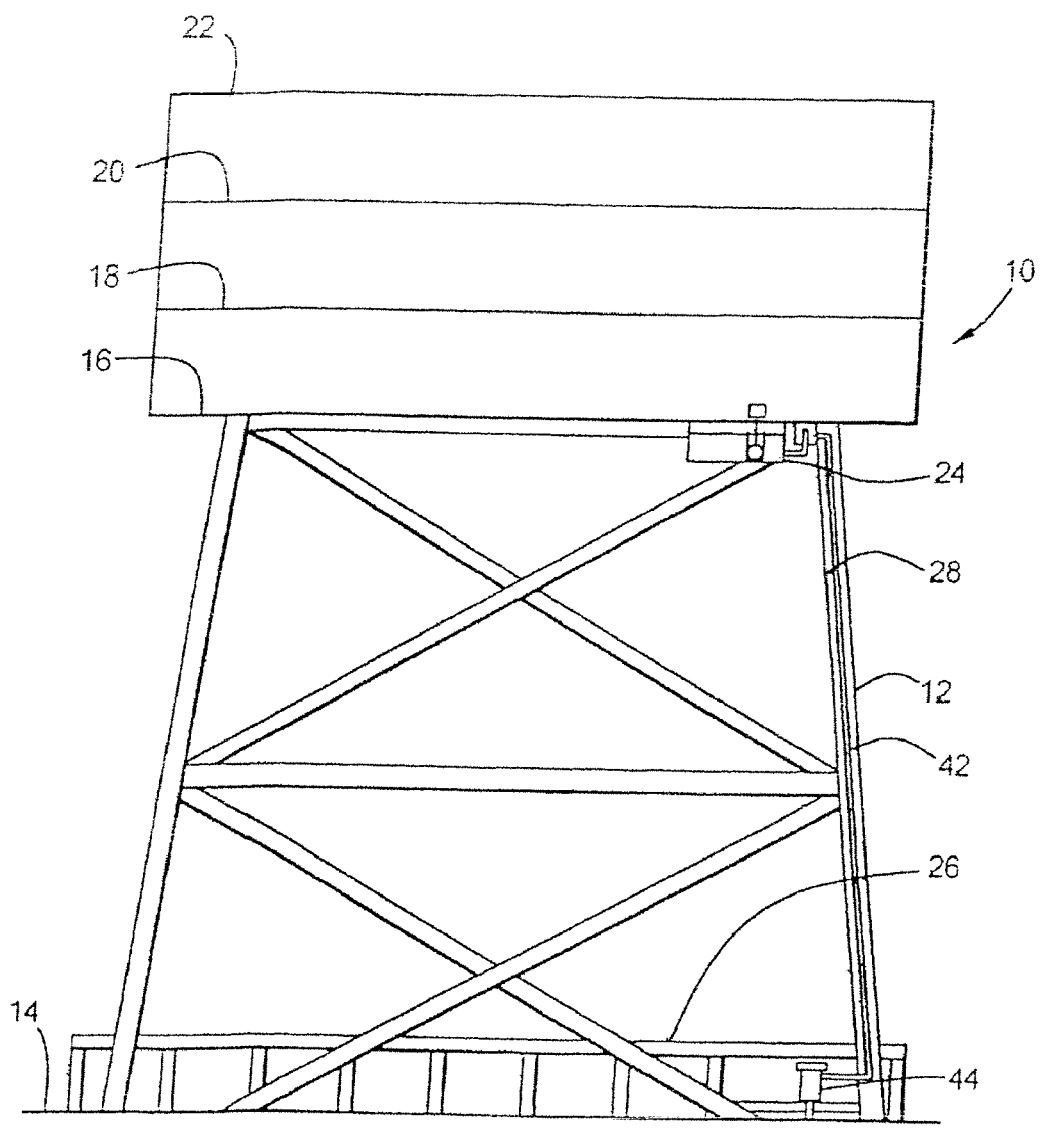
FIG. 4 is a side view of an offshore oil well drilling platform generally showing the Hg/As removal media held within a canister attached to an offshore oil well drilling platform support structure with an alternative placement of a sump tank.

Turning now to the drawings, and initially to FIG. 4, there is shown an offshore drilling platform generally designated by reference numeral 10 including a work deck support structure 12 for supporting a plurality of stacked work decks at a substantial height above an ocean water level 14. The work decks commonly include a cellar deck 16 at a lowest work deck level, a second deck 18 located directly above the cellar deck 16, a third deck 20 disposed directly above deck 18, and a main deck 22 at an uppermost work deck level. In extant offshore drilling platforms, a sump tank 24 has been connected to the drilling platform 10 at the cellar deck level 16 and rainwater, including entrained hydrocarbons, particularly oil, paraffins and surfactants have been directed from all deck levels, which are contained so that rainwater and entrained hydrocarbons do not spill over to the ocean, to drain by gravity into the sump tank 24. As described in this assignee's U.S. Pat. Nos. 6,398,951; 6,398,966; 6,409,924; and 6,749,757, hereinafter incorporated by reference, further separation of hydrocarbons from rainwater, in addition to gravity separation, is required for effective elimination of ocean water hydrocarbon contamination by providing a secondary hydrocarbon recovery apparatus containing an organo-clay after the produced water and/or rainwater has been separated by gravity in the sump tank 24 or 24A. In the preferred embodiment of mercury and/or arsenic removal using the methods and apparatus described herein for mercury and arsenic removal offshore, one or more canisters (not shown) containing an organoclay, for hydrocarbon removal, is used in series with one or more canisters containing the Hg/As removal media (in any order). It is preferred to remove the hydrocarbons with organoclay-containing canister(s) prior to mercury and/or arsenic removal with Hg/As removal media-containing cartridges.

In accordance with a preferred embodiment of the methods, apparatus and Hg/As removal media described herein, it has been found that the apparatus and methods described herein function best, in offshore platform use, when the sump tank 24A is disposed on or near a boat landing deck level 26 (FIG. 4) of the offshore drilling platform 10. However, the sump tank can also be disposed at an upper level, such as at reference numeral 24 in FIG. 4.

Mercury and/or arsenic from ocean water that is collected on the production decks 16, 18, 20 and 22 that may accumulate during dry weather on the inner surfaces of the conduit 28 and inner surfaces of sump tank 24 can be separated from the water that flows from the decks to the Hg/As removal media-containing cartridge 44 for recovery and separation in accordance with the apparatus and methods described herein.

Water containing mercury and/or arsenic is conveyed via conduit 28 from the deck areas 16, 18, 20 and 22 along the platform infrastructure or support leg 12 down to the sump tank 24 or 24A, preferably sump tank 24A for convenient servicing and/or Hg/As removal media cartridge replacement. As stated in this assignee's U.S. Pat. Nos. 6,398,951, 6,398,966 and 6,409,924, it is expedient to dispose the separation apparatus described herein at or near the boat landing deck level 26 (such that at least a portion of the sump tank 24A is within about 10 feet of ocean level) since contaminants collected on the production decks 16, 18, 20 and 22 that may accumulate during dry weather on the inner surfaces of the conduit 28 and inner surfaces of sump tank 24A can be separated from the water that flows from the decks to the sump tank 24A for recovery and separation in accordance with the apparatus and methods described herein.

Figure 5:
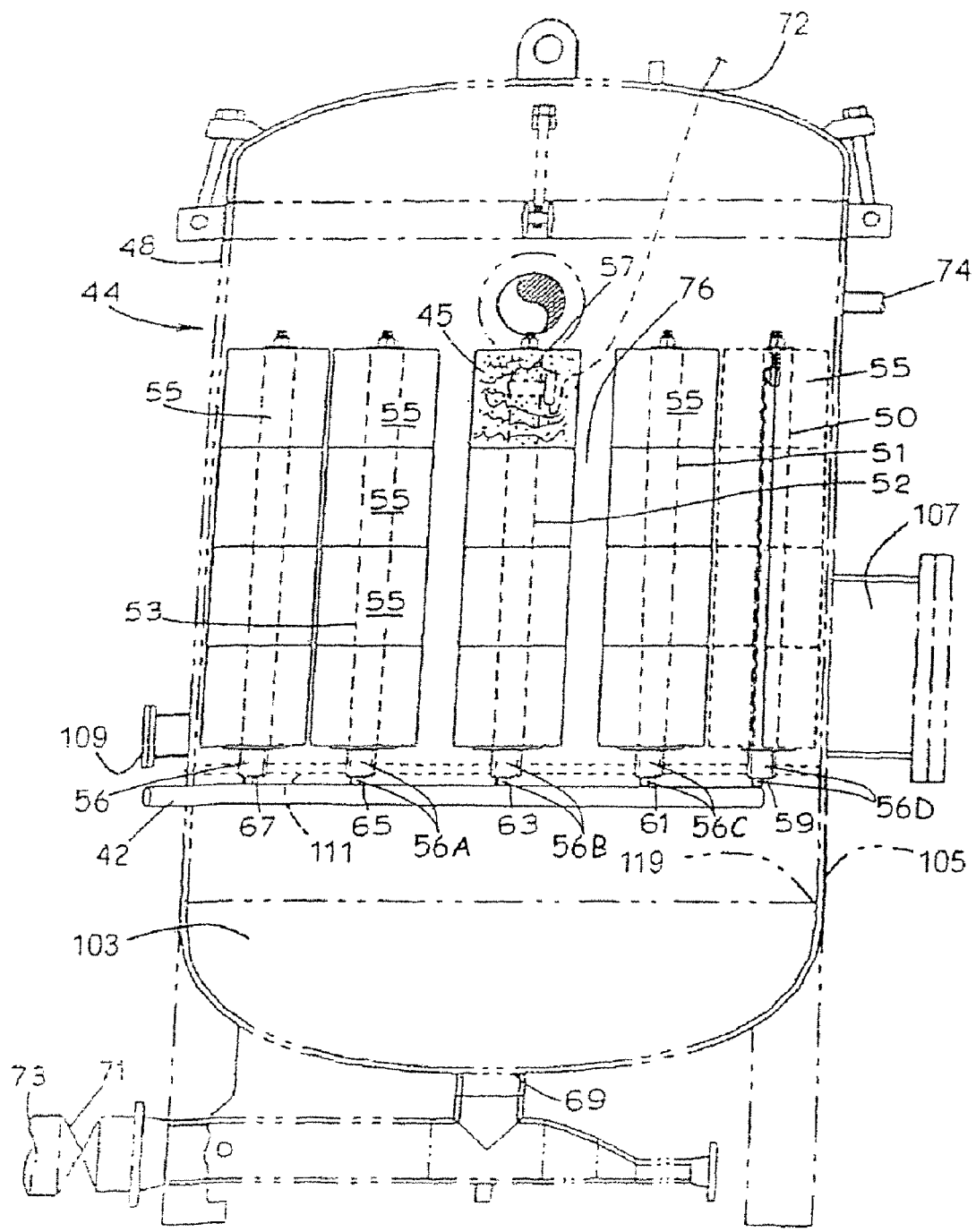
FIG. 5 is a sectional view of an embodiment of a vessel containing a plurality of Hg/As removal media-containing cartridges or canisters for efficient removal of mercury and arsenic contained in water.

In accordance with an important feature of the methods, apparatus and mercury removal media described herein, a downwardly extending leg portion 42 of water leg 34 is operatively interconnected to, and in fluid communication with, one or more mercury and/or arsenic media-containing vessels 44. As shown in FIG. 5, the mercury removal media within vessel 44 captures the mercury and thereby separates essentially all mercury from the water (less than about 10 parts per million, preferably less than about 1 part per million mercury remains). The treated water flows through the liquid-permeable covers 76 of the cartridges 55 into the vessel 44. The treated water then flows by gravity through water exit opening 46 in the water and coalesced hydrocarbon collection vessel 44 and through exit conduit 48 back to the ocean water 14.

Figure 8:
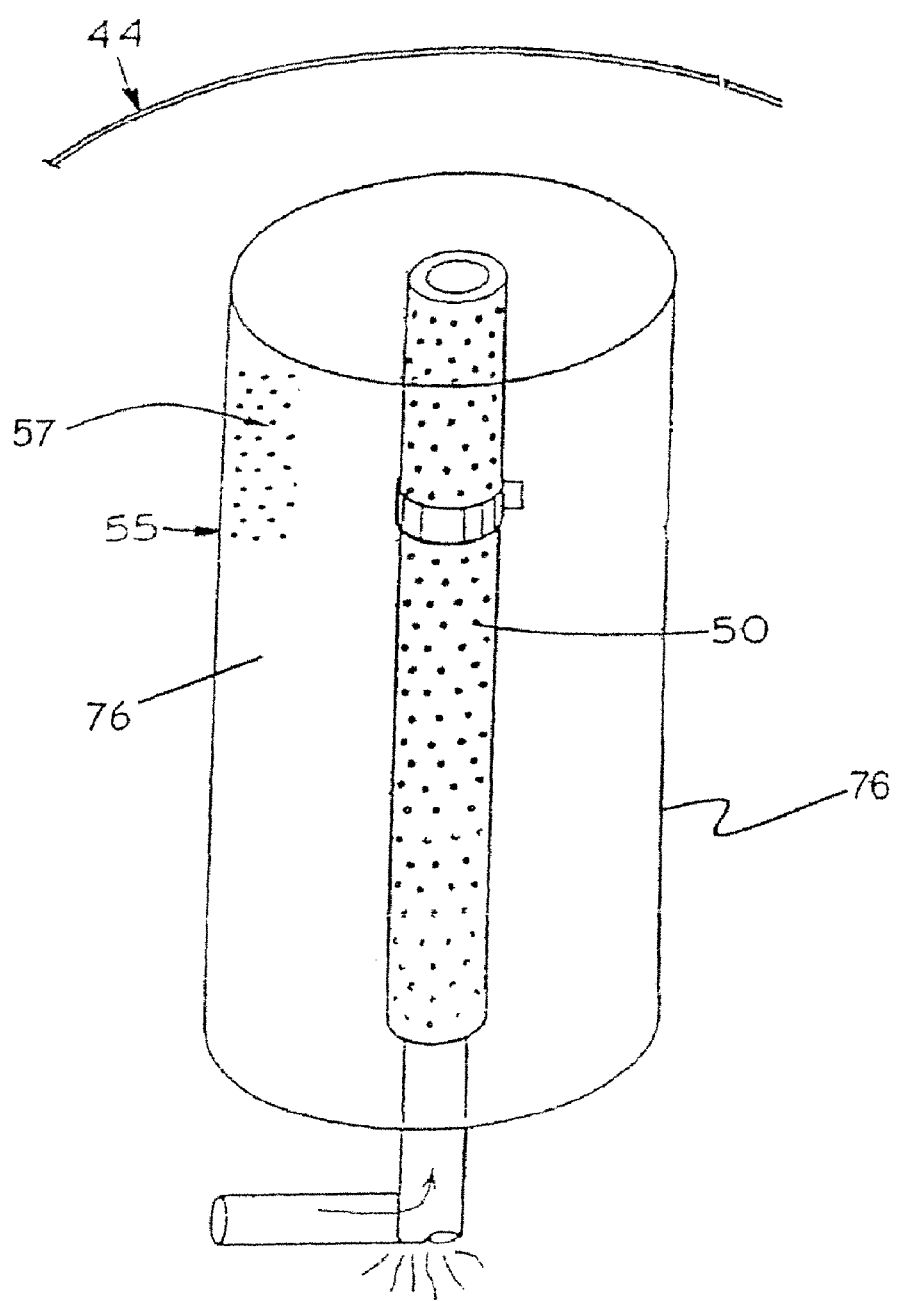
FIG. 8 is a partially broken-away side view of an embodiment of a Hg/As removal media-containing vessel, containing multiple, stacked cartridges (FIGS. 5 and 6).

As shown in FIGS. 5 and 8, vessel 44 includes an outer, fluid-impermeable housing 48 having a water inlet 42 interconnected through the housing 48 so that mercury-contaminated water enters vessel 44 and then flows through the Hg/As removal media-containing cartridges 55, through a plurality of longitudinal, axial, central inlet conduits 56, 56A, 56B, 56C and 56D that may form part of a header, described in more detail hereinafter. The mercury removal media-containing cartridges 55 are water-permeable by virtue of flow apertures 57, in the cartridge cover 76, that are sized sufficiently small such that the mercury removal media does not pass therethrough. Water entering vessel 44 through inlet conduit 42 and cartridge inlet conduits 56, 56A, 56B, 56C and 56D flows radially outwardly through the mercury removal media 45 where the mercury removal media captures, and removes, the mercury from the contaminated water. The purified water flows through the openings 57 in each liquid permeable cartridge cover 76 and collect in vessel 44. The clean water exits the vessel 44 through exit conduit 69 and through valve 71 and then is returned to the ocean 14 via outlet 73.

Figure 6:
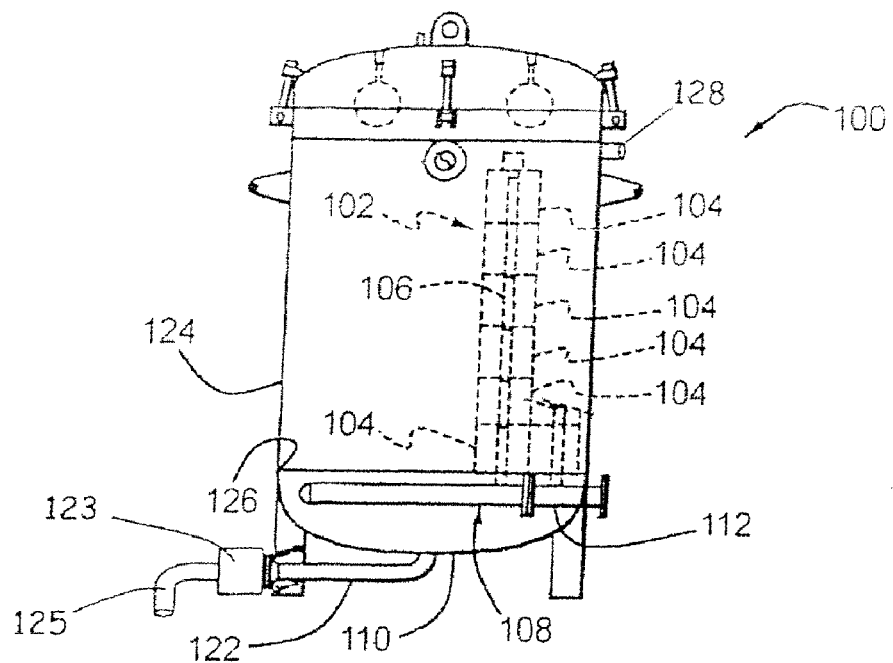
FIG. 6 is an elevational view of a preferred embodiment of a vessel containing a plurality of Hg/As removal media-containing cartridges or canisters.

Turning to FIG. 6, another embodiment of a vessel 100 is shown containing stacks of cartridges, one of which is shown at 102. Each cartridge stack includes a plurality of annular cartridges 104 through which a porous contaminated liquid inlet conduit 106 extends. The porous inlet conduit 106 is connected to a header 108 which is disposed within a bottom section 110 of the vessel 100, similar to the contaminated water inlet conduits 56, 56A, 56B, 56C and 56D shown in FIG. 5.

Figure 7:
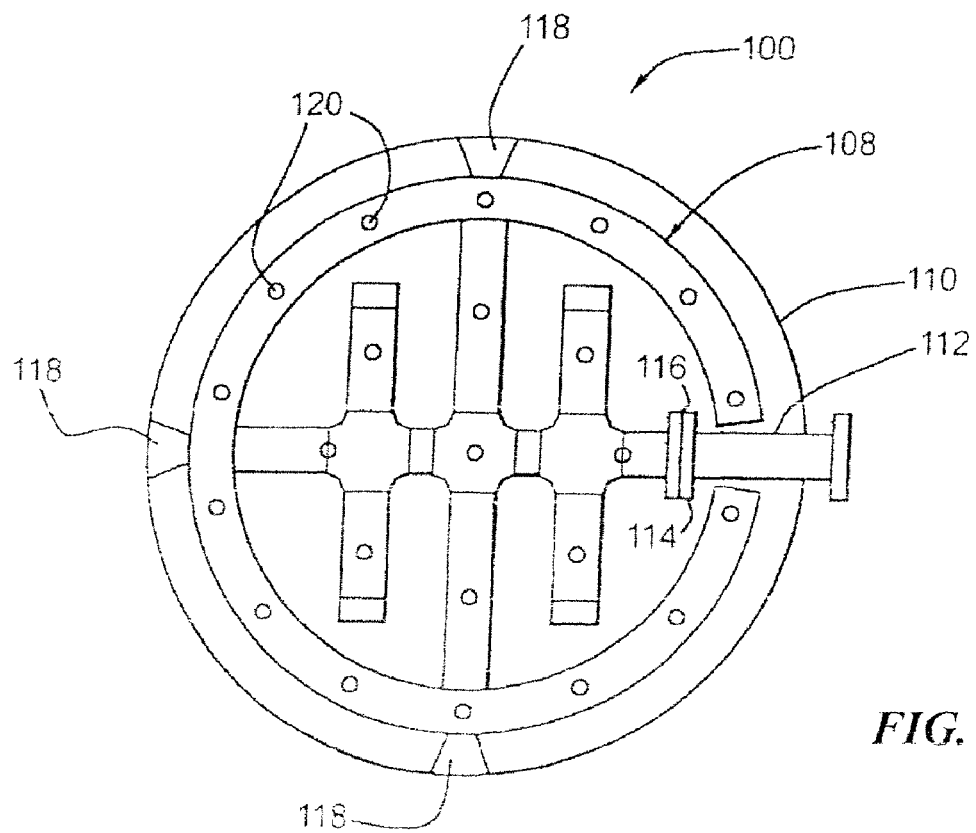
FIG. 7 is a top plan view of the header of the vessel shown in FIG. 6 and openings within the header for receiving permeable conduits each of which can extend through a stack of cartridges or canisters as shown in FIGS. 5 and 6.

Turning to FIGS. 6 and 7, the header 108 is connected to a mercury-contaminated water inlet 112 which includes a flange 114 which is connected to the flange 116 of the header 108 by a plurality of fasteners, such as bolts (not shown). The header is also supported within the bottom structure 110 (see FIG. 6) of the vessel by a plurality of supports shown at 118. The header 108 includes a plurality of openings 120, each of which receives a permeable conduit 106 (see FIG. 6). In the embodiment illustrated in FIGS. 6 and 7, the header 108 is connected to 23 permeable conduits and therefore supports 23 stacks 102 of cartridges 104. By providing the header 108 within the bottom structure 110 of the vessel 100, a permeable tube sheet 111 shown in FIG. 5 is not needed for collecting solids and the bottom section 110 of the vessel can be used to collect accumulated solids, or solids which do not pass through the outer covers 76 of the filter cartridges 104. A drain 122 is provided for purposes of flushing out the accumulated solids which settle in the bottom structure 110 of the vessel 100, together with the clean water. The clean water can be passed through a solids filter 123 before being directed to the ocean through conduit 125. In contrast, solids will accumulate on top of the tube sheet 111. Thus, the solids must be removed from above the tube sheet 108 using one or more nozzle openings shown at 109 in FIG. 5. As shown in FIG. 6, these additional nozzle openings are not required in the vessel 100 because the accumulated solids are easily flushed down the drain pipe 122 into solids filter 123.

Figure 9:
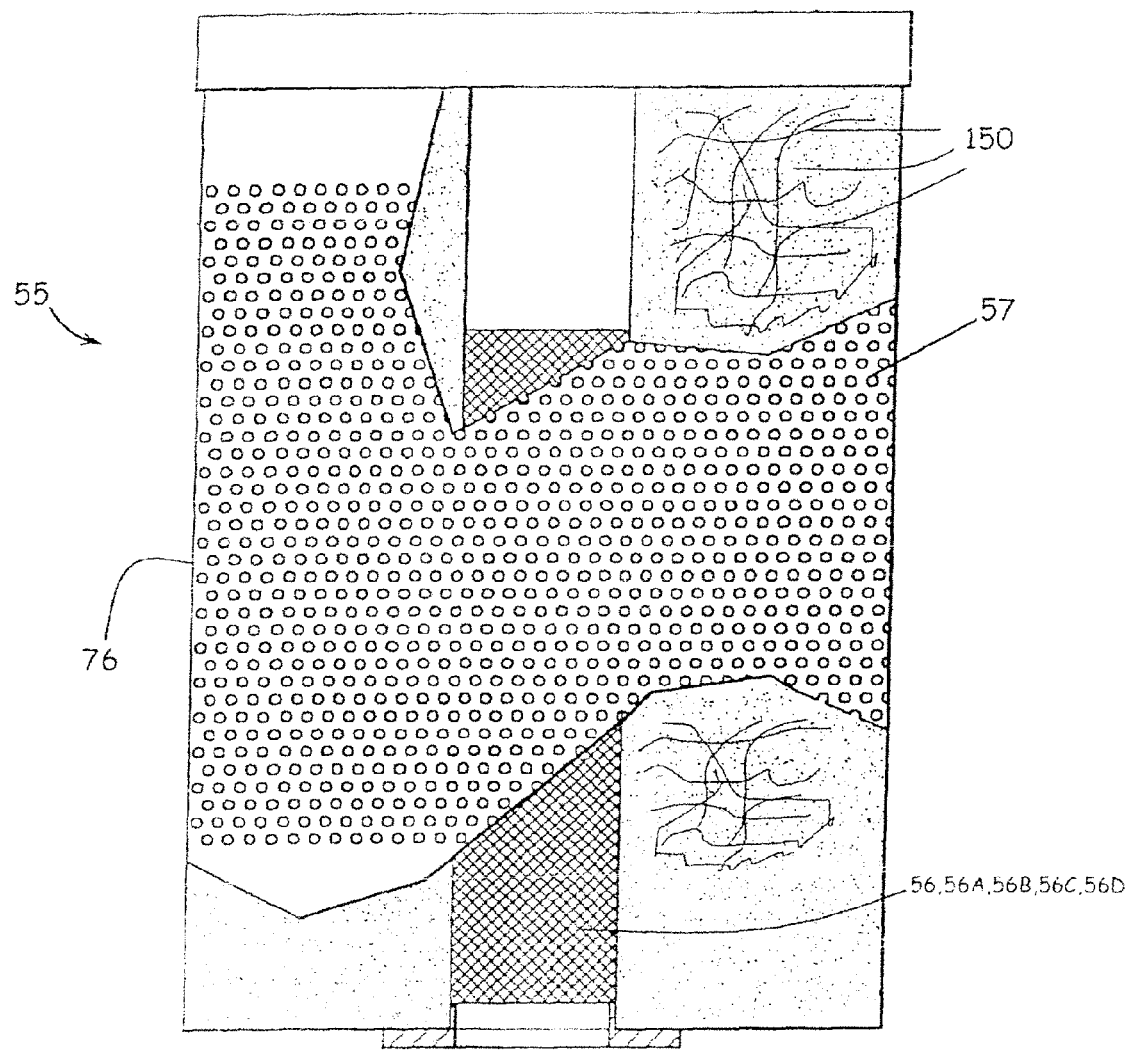
FIG. 9 is a side view of a single cartridge containing the Hg/As removal media.

As shown in FIG. 6, an extremely dense number of stacks of cartridges 104 is provided by the header 108. Specifically, the header 108, as shown in FIG. 7, includes 23 openings 120, and therefore 23 porous conduits 106 and therefore 23 stacks 102 of cartridges 104. Accordingly, the volumetric flow rate that can be handled by the vessel 100 is substantially greater than the volumetric flow rate that can be handled by the vessel 44. Of course, smaller vessels with fewer stacks of cartridges and large vessels with more stacks of cartridges are anticipated FIG. 9 illustrates a single cartridge 55 containing the Hg/As removal media 45 that is loosely packed within the canister 55 between liquid-permeable contaminated water inlet tube (56, 56A, 56B, 56C and 56D of FIG. 3) and an outer, liquid-permeable cartridge cover 76. As shown, the mercury removal media 45 comprises an organoclay containing sulfur.

What is claimed:

1. A contaminant removal media for removing mercury and/or arsenic from water or removing mercury from a gas, by contact, comprising: an intimate mixture of an organoclay and elemental sulfur in its free state.

2. The contaminant removal media of claim 1, wherein the percentage of components is as follows:
   a) organoclay: 50 to 99.5 wt. %;
   b) elemental sulfur: 0.5 to 50 wt. %.

3. The contaminant removal media of claim 2, wherein the organoclay comprises a layered phyllosilicate intercalated with an intercalant agent, and wherein the percentage of components is as follows:
   a) phyllosilicate: 1-90%; intercalant agent 10-50%;
   b) elemental sulfur: 0.5-50%.

4. The contaminant removal media of claim 3, wherein the percentage of components is as follows:
   a) phyllosilicate: 35-83%; intercalant agent 15-45%;
   b) elemental sulfur: 2-20%.

5. The contaminant removal media of claim 4, wherein the percentage of components is as follows:
   a) phyllosilicate: 50-77%; intercalant agent 20-40%;
   b) elemental sulfur: 3-10%.

6. The contaminant removal media of claim 5, wherein the percentage of components is as follows:
   a) phyllosilicate: 59-71%; intercalant agent 25-35%;
   b) elemental sulfur: 4-6%.

7. The contaminant removal media of claim 6, wherein the percentage of components is as follows:
   a) phyllosilicate: 65%; intercalant agent 30%;
   b) elemental sulfur: 5%.

8. The contaminant removal media of claim 1, wherein the mixture is compacted in an extruder.

9. The contaminant removal media of claim 1, wherein the elemental sulfur has a particle size such that at least 80% by weight of the particles are finer than 18 mesh, U.S. Sieve Series.

10. The contaminant removal media of claim 9, wherein the elemental sulfur has a particle size such that at least 80% by weight of the particles are finer than 50 mesh, U.S. Sieve Series.

11. The contaminant removal media of claim 10, wherein the elemental sulfur has a particle size such that at least 80% by weight of the particles are finer than 70 mesh, U.S. Sieve Series.

12. The contaminant removal media of claim 11, wherein the elemental sulfur has a particle size such that at least 80% by weight of the particles are finer than 80 mesh, U.S. Sieve Series.

13. The contaminant removal media of claim 12, wherein the elemental sulfur has a particle size such that at least 80% by weight of the particles are finer than 100 mesh, U.S. Sieve Series.

14. The contaminant removal media of claim 1, wherein the media comprises particles having a particle size such that at least 80% by weight of the particles are finer than 5 mm.

15. The contaminant removal media of claim 14, wherein the media comprises particles having a particle size such that at least 80% by weight of the particles are finer than 3 mm.

16. The contaminant removal media of claim 15, wherein the media comprises particles having a particle size such that at least 80% by weight of the particles are finer than 2 mm.

17. A contaminant removal media for removing mercury or arsenic from water or for removal of mercury from a gas, by contact, comprising: an intimate mixture of a layered phyllosilicate intercalated with a surface-modifying, layer-expanding intercalant and elemental sulfur in its free state.

18. The contaminant removal media of claim 17, wherein the mixture is compacted in an extruder.

19. The contaminant removal media of claim 17, wherein the layer-expanding intercalant is selected from the group consisting of onium ions, a polymer, and a mixture thereof.

20. The mercury removal media of claim 16, wherein the elemental sulfur has a particle size such that at least 80% of the particles are finer than 18 mesh, U.S. Sieve Series.

21. The mercury removal media of claim 20, wherein the elemental sulfur has a particle size such that at least 80% of the particles are finer than 50 mesh, U.S. Sieve Series.

22. The mercury removal media of claim 21, wherein the elemental sulfur has a particle size such that at least 80% of the particles are finer than 70 mesh, U.S. Sieve Series.

23. The mercury removal media of claim 22, wherein the elemental sulfur has a particle size such that at least 80% of the particles are finer than 80 mesh, U.S. Sieve Series.

24. The mercury removal media of claim 23, wherein the elemental sulfur has a particle size such that at least 80% of the particles are finer than 100 mesh, U.S. Sieve Series.

* * * * *

UNITED STATES PATENT AND TRADEMARK OFFICE
CERTIFICATE OF CORRECTION

PATENT NO.       : 8,025,160 B2  
APPLICATION NO.  : 12/116405  
DATED            : September 27, 2011  
INVENTOR(S)      : Zhen Wang et al.

Page 1 of 1

It is certified that error appears in the above-identified patent and that said Letters Patent is hereby corrected as shown below:

Column 12, line 35, "16" should be --17--.

Signed and Sealed this
Twenty-fifth Day of September, 2012

David J. Kappos
*Director of the United States Patent and Trademark Office*